UNITED STATES PATENT OFFICE.

BENNO JAFFÉ AND LUDWIG DARMSTAEDTER, OF MARTINICKENFELD, GERMANY.

PROCESS OF SEPARATING WOOL-FAT INTO HARD AND SOFT PRODUCTS.

SPECIFICATION forming part of Letters Patent No. 540,256, dated June 4, 1895.

Application filed October 12, 1892. Serial No. 448,701. (No specimens.) Patented in Luxemburg August 4, 1892, No. 1,665; in England August 4, 1892, No. 14,114, and in Italy August 25, 1892, XXVI, 32,467, LXIII, 473.

*To all whom it may concern:*

Be it known that we, BENNO JAFFÉ and LUDWIG DARMSTAEDTER, subjects of the Emperor of Germany, and residents of Martinickenfeld, near Charlottenburg, Germany, have invented a certain new and useful Improvement in the Separation of Wool-Fat into Hard and Soft Varieties, (for which we have obtained Letters Patent in Luxemburg, No. 1,665, dated August 4, 1892; in England, No. 14,114, dated August 4, 1892, and in Italy, Vol. 26, No. 32,467, and Vol. 63, No. 473, dated August 25, 1892,) of which the following is a specification.

Natural wool fat in its crude state consists of pure wool fat, by which is understood the ethers of cholesterine and of isocholesterine with fatty acids, mixed with inorganic matter due to presence of dirt, certain resinous compounds and pyroleic acids, soapy matters and other incidental impurities, and various methods have been proposed and adopted by which the said ethers of cholesterine and of isocholesterine with fatty acid could be obtained in a body separate from the other matters above referred to. Pure wool fat however itself consists of a mixture of various similar bodies being ethers of cholesterine or of isocholesterine with various fatty acids, and these bodies are of different degrees of hardness or softness from waxy ethers of a high fusing point down to those of semi fluid nature. It has already been recognized that such different degrees of hardness existed. Thus in the German patent, No. 42,172, granted to Dr. A. v. Rad a process is described for extracting wool fats of different consistencies out of suint, that is to say, the refuse of the waste water from wool scouring works mixed with lime water, precipitated and concentrated to the consistency of dough, or in other words a lime soap containing varying quantities of suint incapable of being saponified by lime. This process however consisted in treating said dough like mass first with a high-grade alcohol thus obtaining the softer suint, next with a benzine, bisulphide of carbon, or benzole to obtain the suint of medium softness, and lastly with ether and chloroform to extract the hardest of the suint. It has also been sought by the process described in German Patent No. 55,110 to produce from wool fat a substance to which the name of cholesterine wax has been given, by a chemical splitting up of the constituents of the wool fat. This substance however is not a cholesterine or isocholerine ether, but is free cholesterine or isocholesterine with higher fat-alcohols and is obtained by separating the higher fatty acids by saponification, dissolving said soaps in certain hot solvents, and separating the same by cooling and obtaining the remaining "cholesterine wax" by distillation of the solution. This wax is therefore not the same body as the waxy ethers obtained by the process invented by us.

Our process enables us to separate the pure wool fat, whether it be previously freed from impurities or not, into harder components and softer components, both being cholesterine or isocholesterine ethers in combination with fatty acids, and to pursue the process in such a way that the hardest varieties are first obtained and the other varieties successively according to their relative hardness until eventually only the softest are left, thus enabling the manufacturer to control or arrest the separation at any time and so obtain one or more products of different degrees of hardness according to the degree to which the process has been carried, for instance from a substance adapted to replace beeswax in many industries down to a soft suint more suitable than ordinary suint for the manufacture of lanoline.

We perform our improved process by dissolving the ordinary wool fat in fusel oil and then cooling down the solution, by which means we have found that the various wool waxes or wool fats separate from the solution one after another in the order of their hardness, the first to separate being the hardest and the last to remain in solution being the softest. Having thus removed from the solution all the harder grades of wool wax or wool fat so as to leave in solution only the softest variety and such of the others nearer thereto in softness as may be desired to remain in company therewith, the solution is subjected to ordinary distillation thus distilling off the fusel oil and leaving the softer varieties of the wool fat.

It will be obvious that by pursuing the above process and from time to time removing the precipitated matters a manufacturer may separate the suint into an indefinite number of components each being a combination or group of combinations of cholesterine or isocholesterine ether with a fatty acid or acids distinguished from each other by their relative hardness or softness.

We claim—

The method of dividing woolfat into a series of components of different hardness, consisting in dissolving woolfat in fusel oil, subsequently cooling the solution below the temperature of solution of the woolfat, removing from time to time the grades of woolfat deposited from solution as the temperature is successively lowered, and separating the softer grades remaining in solution by evaporating the solvent.

In testimony whereof we have signed this specification in the presence of two subscribing witnesses.

BENNO JAFFÉ.
LUDWIG DARMSTAEDTER.

Witnesses:
W. HAUPT,
P. KAYSER.